3,708,509
PROCESS FOR PREPARING BENZOQUINONE
Samuel N. Holter, Penn Hills, Pa., assignor to
Koppers Company, Inc.
No Drawing. Filed Nov. 15, 1971, Ser. No. 198,978
Int. Cl. C07c 49/64
U.S. Cl. 260—396 R    4 Claims

ABSTRACT OF THE DISCLOSURE

A process for preparing benzoquinone by oxidizing p-aminophenol with vanadium pentoxide in an acidic aqueous solution, and following recovery of the benzoquinone by steam distillation, regenerating the vanadium pentoxide.

FIELD OF THE INVENTION

This invention relates to the preparation of quinones from aromatic amines; more particularly to the oxidation of p-aminophenol by vanadium pentoxide and, following product recovery, regenerating the vanadium pentoxide.

BACKGROUND OF THE INVENTION

The oxidation of organic compounds has received a fair amount of attention by those working in the art. Yet, the nature of the structure of organic compounds makes prediction of oxidation mechanisms uncertain. There is even disagreement as to the definition of oxidation; it is generally agreed, however, that any discussion of oxidation involves (i) the loss of hydrogen from a substance; (ii) the addition of oxygen to a substance; and (iii) the loss of electrons from a substance. A substance having the ability to effect one or more of the foregoing changes upon an organic compound may be termed an "oxidizing agent" or an "oxidant."

In inorganic chemistry, the ability of a particular substance to oxidize another (i.e., oxidizing power) has been fairly well conceptualized. That is, in describing reactions of ionizable substances, a comparison of the oxidizing power of different ions by reference to a standard results in a measure of predictability. These concepts do not clearly apply in organic chemistry.

Organic compounds are essentially covalent and the fission of that covalent bond is an essential feature of organic reactions. Thus, while it may be known what structural change is necessary to transform one organic compound into another, the mechanism, the correct oxidant and the process for effecting that change is usually highly uncertain. Such is the case in the present invention.

DESCRIPTION OF THE PRIOR ART

Benzoquinone has long been prepared commercially by the oxidation of aniline with manganese dioxide and sulfuric acid:

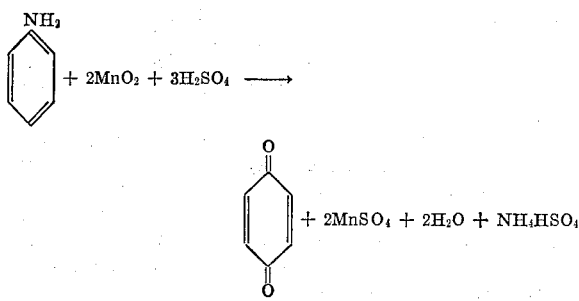

Benzoquinone is easily reduced with iron and water to produce hydroquinone

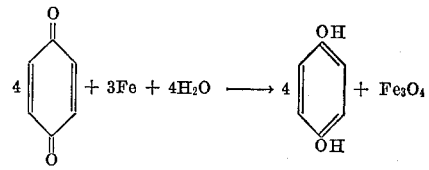

which has wide application in the graphic arts as a photographic developer. Hydroquinone is also useful as an antioxidant and has found miscellaneous applications such as in dyes and medicinals.

The known process for producing p-benzoquinone is disadvantageous because manganese sulfate is produced as a by-product, thereby creating a waste disposal problem. Thus, an alternative, improved process for producing hydroquinone has been sought.

It is known that benzoquinone can be formed by the oxidation of aminophenols and diamines, because the intermediate quinonimines and quinonediimines are hydrolyzed rapidly in aqueous solution. However, suitable processes and effective oxidants to produce benzoquinone in high yield from starting materials of that type were not known prior to the present invention.

It has been discovered that p-aminophenol can be oxidized by a pentavalent vanadium compound, preferably vanadium pentoxide, to produce benzoquinone:

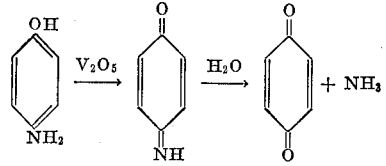

which can subsequently be reduced to hydroquinone as described above. Thus, the present invention represents an important link in a competitive and ecologically safe process for preparing hydroquinone.

The term benzoquinone as used herein is understood to refer to the para isomer of benzoquinone.

SUMMARY OF THE INVENTION

The present invention provides a process for preparing benzoquinone comprising: contacting a suspension of vanadium pentoxide in an acidic aqueous solution of p-aminophenol to form a reaction mixture; and recovering benzoquinone from the reaction mixture. The present invention further provides that the recovery of the benzoquinone product includes distilling benzoquinone from the reaction mixture and thereafter heating the residue of the reaction mixture in the presence of oxygen, preferably to a temperature of at least 400° C., to regenerate the vanadium pentoxide.

More specifically, the present invention provides a process for oxidizing p-aminophenol to produce benzoquinone comprising the steps of: adding an aqueous solution of p-aminophenol to a suspension of vanadium pentoxide in an acidic aqueous solution to form a reaction mixture; continuously passing steam through the reaction mixture so formed during the addition of the p-aminophenol solution to recover benzoquinone therefrom; and heating the residue of the reaction mixture in the presence of oxygen following the addition step to regenerate the vanadium pentoxide.

The term "regenerate" as used herein means to restore the spent vanadium residue to its initial state—vanadium pentoxide.

DETAILED DESCRIPTION OF THE INVENTION

Preparation of p-aminophenol p-Aminophenol has been prepared by a variety of methods. The older techniques include the reduction of p-nitrophenol by either catalytic hydrogenation or the use of reducing agents. More recently, p-aminophenol has been prepared by the reduction of nitrobenzene (i) with aluminum in acid solution; (ii) electrochemically in acid solution in the presence of stannous salts; and (iii) by hydrogenation in the presence of a catalyst such as platinum on carbon and platinum sulfide combined with a simultaneous rearrangement of the intermediate, N-phenylhydroxylamine.

Example I below describes a method for preparing p-aminophenol in a rocking autoclave by catalytic reduction of nitrobenzene in the presence of sulfuric acid. Aniline was also obtained under the conditions set forth there. Other runs made in accordance with the procedures of Example I are tabulated in Table A.

EXAMPLE I

A glass liner to fit a 2.4 liter rocking autoclave was charged with 12.3 g. (0.1 mole) nitrobenzene (Fisher Certified), 12 g. concentrated sulfuric acid in 300 ml. of water and 1.0 g. sulfided 5% Pt/C. The hydrogenation was performed at 125° under 500 p.s.i. of hydrogen.

After hydrogen uptake had ceased, the catalyst was removed by filtration and the filtrate made alkaline with concentrated ammonium hydroxide (pH 9). Upon becoming alkaline, the solution immediately became dark in the presence of air. The alkaline solution was extracted with 12× 250 ml. portions of ether. The ether extract was dried over magnesium sulfate, filtered, and evaporated on a steam bath to afford a residue of 7.9 g. The residue was washed with 100 ml. of benzene to yield 4.2 g. of p-aminophenol. The filtrate from the benzene wash was evaporated to yield 1.9 g. of aniline.

p-Aminophenol produced in this manner for subsequent oxidation to benzoquinone should be substantially free of aniline to avoid reduced product yields.

The product of the reduction of nitrobenzene will generally contain a small amount of o-aminophenol. However, the presence of this isomer in amounts up to about 4% probably will have no adverse effect upon the yields obtained with the present invention.

significant decrease in yield has been observed with ratios up to 20:1. $V_2O_5$/p-aminophenol ratios above that range will involve large volumes of water since the $V_2O_5$ is held in suspension and this imposes practical limitations upon the process.

The oxidation reaction is carried out in an aqueous solution containing a strong, preferably nonvolatile, acid such as sulfuric acid. The acid concentration is not critical although p-benzoquinone is unstable in the presence of strong acid; therefore the concentration of acid should not exceed about 0.12 molar in order to obtain good yields of benzoquinone.

The reaction is preferably carried out by adding an aqueous solution of p-aminophenol to a suspension of $V_2O_5$ in an acidic aqueous solution. Reverse addition procedures may be used, however, to carry out the process. The presence of strong acid improves product yield; however, a portion of the total acid used may be contained in the p-aminophenol starting solution without adverse effects.

The possibility of side-reactions between the reactants and the benzoquinone formed by the reaction makes it desirable to continually remove product from the reaction mixture as it is formed. This is accomplished by vigorously passing steam through the reaction mixture during the addition of p-aminophenol thereby distilling off the p-benzoquinone product. Under these conditions, the temperature of the reaction mixture is maintained at about 100° C. However, it is believed that the process of the invention can be carried out below 100° C. by operating under reduced pressure. Operation at temperatures above 100° C. is also believed possible in appropriate pressure apparatus. Obviously, however, economic considerations makes it desirable to operate the process at atmospheric pressure.

A unique advantage of the present invention is the ability to regenerate the oxidant by heating the solids from the reaction mixture in an oxidizing atmosphere. The regeneration step may be performed by either filtering the residual solids from the reaction and heating them in air or by heating the residue of the reaction in the reaction vessel under pressure in the presence of oxygen. Recovery of $V_2O_5$ by the latter technique of regenerating the $V_2O_5$

TABLE A

| Run number: | Nitrobenzene, moles | $H_2SO_4$ | Catalyst,[a] g. | Temp., °C. | Pressure, lb./in.² | p-Aminophenol, percent yield | Anilin, percent yield |
|---|---|---|---|---|---|---|---|
| 1 | 0.1 | 12 g./300 ml. $H_2O$ | 1.0 | 110 | 500 | 35 | |
| 2 | 0.1 | 12 g./300 ml. $H_2O$ | 1.0 | 95 | 500 | 29 | 22 |
| 3 | 0.1 | 12 g./300 ml. $H_2O$ | 1.0 | 80 | 500 | 38 | |
| 4 | 0 2 | 12 g./300 ml. $H_2O$ | 1.0 | 125 | 500 | 33 | 12 |
| 5 | 0.8 | 200 g. (48%) | 2.0 | 135 | 500 | 59 | |
| 6 | 0.8 | 200 g. (48%) | [b]1.0+2.0 | 135 | 500 | 55 | 13 |
| 7 | 0.8 | 200 g. (48%) | 2.0 | 120 | 400 | 48 | 12 |
| 8 | 0.8 | 200 g. (48%) | 2.0 | 135 | 500 | 54 | 17 |
| 9 | 0.8 | 200 g. (24%) | 2.0 | 135 | 500 | 58 | 15 |

[a] 5% PtS/C.
[b] One g. of catalyst initially charged. It was necessary to add more catalyst to complete reduction.

Preparation of benzoquinone

The preferred starting material for use in the present invention is p-aminophenol. It is believed, however, that other compounds may also be oxidized according to the present invention to produce quinones; these compounds include the diamines, analogs of p-aminophenol, and methyl-substituted derivatives of p-aminophenol and the diamines.

According to the invention, the p-aminophenol is oxidized by a pentavalent vanadium compound, preferably vanadium pentoxide. The molar ratio of $V_2O_5$ to p-aminophenol in the reaction should be maintained at about 4:1 or above to achieve good product yields. No in situ offers particular advantages in time-saving and equipment costs because no external filtration and evaporation steps are required. Regeneration of $V_2O_5$ according to the invention has been shown to be complete and little, if any, loss of activity in the regenerated $V_2O_5$ has been observed.

The temperature required for regeneration is about 400° C. Higher temperatures may be employed but care must be exercised to not reach the fusion temperature of $V_2O_5$ which is about 50–70° C. below its melting point.

The present invention may be illustrated by reference to the non-limiting examples which follow. All percentages are by weight unless otherwise stated.

EXAMPLE II

A 1-l. three-necked flask arranged for steam distillation and equipped with an addition funnel and magnetic stirrer was charged with 90.9 g. (0.5 mole) vanadium pentoxide (Fisher Certified) 5.9 g. (0.06 mole) concentrated sulfuric acid and 300 ml. of water. A solution of 10.9 g. (0.1 mole) of p-aminophenol in 200 ml. of water was prepared by heating to approximately 90° and then transferred to the addition funnel which was heated by means of a heating tape. The solution of p-aminophenol was added dropwise to the reaction flask while steam was vigorously passed into the flask. The addition required approximately 2.5 hours. The distillation was continued until the distillate was colorless. The distillate was then extracted with 100 ml. portions of benzene until no further color was imparted to the benzene. A yield of 8.3 g. (77%) of quinone was obtained. The contents of the reaction flask were filtered to remove water insoluble material. The solids were then heated at 600° to give 88.3 g. (97%) of recovered $V_2O_5$.

Additional runs were carried out in accordance with the procedures of Example II and they are reported in Table B below:

It has been found that technical grade $V_2O_5$, unused or regenerated, gives yields of benzoquinone comparable to purified $V_2O_5$.

As stated above, the vanadium pentoxide can be regenerated in an aqueous suspension. Thus, it is believed that the process of the invention is susceptible of continuous operation under oxygen pressure. If, however, a continuous process is not feasible, a cyclic batch process can be used in which the oxidation of p-aminophenol is carried out in a reactor followed by regeneration of the vanadium pentoxide in the same reactor. Example III below confirms the foregoing.

EXAMPLE III

A 2.2 l. rocking autoclave equipped with a 1.9 l. glass liner was charged with approximately 400 ml. of an aqueous suspension of reduced vanadium compounds obtained from the oxidation of p-aminophenol. The autoclave was pressured to 500 p.s.i. with oxygen at ambient temperature and then heated to approximately 300° C. The temperature was maintained at 322° C. for 1.3 hrs. with a corresponding pressure of 1710 p.s.i. Upon discharge of the autoclave, it was observed that the original dark green solids had changed to golden yellow. Chemical analysis of the yellow solids showed the presence of vanadium pentoxide but no reduced vanadium compounds.

TABLE B

| Run number: | p-Aminophenol, moles | Oxidant | Oxidant, moles | $H_2SO_4$, moles | Benzoquinone, percent yield | $V_2O_5$,* percent recovery | Remarks |
|---|---|---|---|---|---|---|---|
| 1 | 0.1 | $V_2O_5$ a | 0.53 | 0.06 | 31 | | |
| 2 | 0.1 | $V_2O_5$ b | 0.5 | 0.06 | 60 | 98 | pH 7 f |
| 3 | 0.1 | $V_2O_5$ c | 0.5 | 0.06 | 44 | 97 | pH 7 f |
| 4 | 0.1 | $V_2O_5$ b | 0.5 | 0.06 | 77 | 100 | |
| | | | As $KHSO_4$ | | | | |
| 5 | 0.05 | $V_2O_5$ c | 0.5 | 0.06 | 81 | 95 | pH 7 f |
| 6 | 0.05 | $V_2O_5$ c | 0.5 | 0.06 | 85 | 76 | pH 3 f |
| 7 | 0.05 | $V_2O_5$ c | 0.5 | 0.06 | 98 | 98 | pH 4 f |
| 8 | 0.05 | $V_2O_5$ c | 0.5 | 0.06 | 91 | 88 | G. |
| 9 | 0.05 | $V_2O_5$ d | 0.5 | 0.06 | 89 | 97 | pH 2 f |
| 10 | 0.05 | $V_2O_5$ b | 0.5 | | 43 | 99 | |
| 11 | 0.05 | $V_2O_5$ b | 0.5 | 0.03 | 89 | 96 | pH 7 f | a Technical grade $V_2O_5$ treated with con c. $NHO_3$.
b Purified $V_2O_5$ (99.9%).
c Purified $V_2O_5$ regenerated.
d Purified $V_2O_5$ regenerated two times.
e Recovery based on water insoluble material only.
f Adjusted reaction mixture to pH indicated berfore filtration.
g Added 20 ml. conc. $NHO_3$ to hot reaction mixture before filtration.

The results of Run No. 10 indicate that some acid in the reaction mixture is necessary in order to obtain good yields of benzoquinone. The table also shows that recovery of the vanadium pentoxide is not affected appreciably by the pH of the reaction mixture before filtration. The $V_2O_5$ was regenerated at 400° instead of 600° used in Example II and thereby avoided the possibility of fusion of the $V_2O_5$.

Table C below reports runs carried out in accordance with the procedures of Example I and illustrates the effect on the yield of benzoquinone of decreasing the $V_2O_5$/p-aminophenol mole ratio.

TABLE C

| Run number: | p-Aminophenol, moles | $V_2O_5$, moles | $H_2SO_4$, moles | Benzoquinone, percent yield | $V_2O_5$, percent recovery |
|---|---|---|---|---|---|
| 12 | 0.025 | a 0.5 | 0.015 | 70 | (b) |
| 13 | 0.05 | a 0.5 | 0.015 | 88 | 96 |
| 14 | 0.063 | a 0.5 | 0.015 | 83 | 98 |
| 15 | 0.083 | a 0.5 | 0.015 | 85 | 98 |
| 16 | 0.125 | a 0.5 | 0.03 | 76 | 95 |
| 17 | 0.25 | a 0.5 | 0.15 | 27 | (b) | a Purified $V_2O_5$ (99.9%).
b $V_2O_5$ recovery not attempted.

What is claimed is:

1. A process for preparing benzoquinone comprising:
   (A) contacting a suspension of vanadium pentoxide in an acidic aqueous solution with an aqueous solution of p-aminophenol at a temperature of about 100° C. and at about atmospheric pressure, the molar ratio of vanadium pentoxide to p-aminophenol being maintained at about at least 4:1, to form a reaction mixture; and
   (B) recovering said benzoquinone from said reaction mixture.

2. A process as recited in claim 1 wherein said recovery includes: distilling benzoquinone from said reaction mixture and thereafter heating the residue of said reaction mixture in the presence of oxygen to regenerate said vanadium pentoxide.

3. A process for preparing benzoquinone comprising the steps of:
   (A) adding an aqueous solution of p-aminophenol to a suspension of vanadium pentoxide in an acidic aqueous solution, the molar ratio of vanadium pentoxide to p-aminophenol being maintained at about at least 4:1, to form a reaction mixture;
(B) continuously passing steam through said reaction mixture during said addition to recover benzoquinone therefrom; and
(C) heating the residue of the reaction mixture in the presence of oxygen following the addition step to regenerate said vanadium pentoxide.

4. A process as recited in claim 3 wherein:
said residue is heated to a temperature of at least 400° C.

References Cited
UNITED STATES PATENTS 1,318,631   10/1919   Weiss et al. _____ 260—396
2,446,856   8/1948   Smith _____ 260—396

VIVIAN GARNER, Primary Examiner

U.S. Cl. X.R.

252—417; 260—575

UNITED STATES PATENT OFFICE
CERTIFICATE OF CORRECTION

Patent No. 3,708,509  Dated January 2, 1973

Inventor(s) Samuel N. Holter

It is certified that error appears in the above-identified patent and that said Letters Patent are hereby corrected as shown below:

Column 3, Table A, Last Heading, "Anilin," should read --Aniline,--;

Column 5, Table B, Footnote a, "NHO3" should read --HNO$_3$--;

Column 5, Table B, Footnote g, "NHO3" should read --HNO$_3$--;

Column 5, Table C, Under Heading "V$_2$O$_5$, percent recovery", "96" should read --99--.

Signed and sealed this 22nd day of May 1973.

(SEAL)
Attest:

EDWARD M. FLETCHER, JR.
Attesting Officer

ROBERT GOTTSCHALK
Commissioner of Patents